United States Patent Office 3,437,709
Patented Apr. 8, 1969

3,437,709
DISPROPORTIONATION OF ALKYL AROMATICS WITH A CRYSTALLINE ALUMINOSILICATE AND OXYGEN
Frank J. Chloupek, South Holland, Ill., assignor to Sinclair Research, Inc., New York, N.Y., a corporation of Delaware
No Drawing. Filed Dec. 21, 1967, Ser. No. 692,328
Int. Cl. C07c 3/62, 3/52
U.S. Cl. 260—672                              18 Claims

ABSTRACT OF THE DISCLOSURE

A disproportion process which comprises contacting a methyl-substituted aromatic compound and a small amount of an oxygen-supplying material in a reaction zone with a calcium, magnesium, or manganese-exchanged crystalline alumino-silicate-containing catalyst at a temperature of 200 to 1100° F. to disproportionate the methyl-substituted aromatic compound. The crystalline aluminosilicate has a pore size of about 8 to 15 A. and a silica to alumina mole ratio of about 3 to 8:1.

---

This invention relates to a process for improving catalyst performance in the disproportionation of methyl-substituted aromatic compounds. More particularly, this invention relates to a process of disproportionating methyl-substituted aromatic compounds using small quantities of oxygen-supplying materials to improve the performance of certain crystalline aluminosilicate catalysts.

The disproportionation of methyl-substituted aromatic compounds is accompanied by a number of complex side reactions, such as aromatization, polymerization, alkylation and the like. As a result of these complex reactions, a carbonaceous deposit is laid down on the catalyst which is commonly called coke. The deposition of coke tends to seriously impair the catalytic efficiency of the catalyst for the principal reaction and the conversion reaction is suspended after coke to the extent of a few percent by weight has accumulated on the catalyst. The catalytic surface is then regenerated by burning the coke in a stream of oxidizing gas and the catalyst is returned to the conversion stage of the cycle.

As will be realized, coke and other undesired products are formed at the expense of useful products. It will also be evident that during the period of regeneration, the catalyst is not being effectively employed for conversion purposes. It accordingly is highly desirable not only to afford a large overall conversion of the methyl-substituted aromatic charge, i.e. to provide a catalyst of high activity, but also to afford an enhanced yield of useful product while maintaining undesired products, such as coke, at a minimum.

In general, the disproportionation of methyl-substituted aromatic compounds over crystalline alumino-silicate catalysts suffers from coking deactivation. Although conversion levels can be quite high in the early stages of the reaction, conversion falls off with time as the carbonaceous deposits accumulate on the catalyst.

The present process employs small amounts of oxygen-supplying materials, preferably air or oxygen, as agents to increase the disproportionation of methyl-substituted aromatic compounds. When these agents are present in the disproportionation of methyl-substituted aromatic compounds over certain crystalline aluminosilicate catalysts, the coking deactivation is lessened. Conversion levels may actually increase with time with very little cracking observed.

In accordance with this invention, small amounts of oxygen-supplying materials, preferably air or oxygen, and a feed which contains a methyl-substituted aromatic compound are contacted with certain metal-exchanged crystalline aluminosilicate-containing catalysts thereby accomplishing, with the oxygen-supplying material present, a higher disporportionation of the methyl-substituted aromatic compound with reduced cracking of the methyl-substituted aromatic compound and reduced coking of the catalyst. The metal-exchanged crystalline aluminosilicate containing catalysts of this invention are calcium exchanged-, magnesium exchanged-, or manganese exchanged-crystalline aluminosilicate-containing catalysts. The disproportionation can be carried out at a temperature of about 200 to 1100° F., preferably about 600 to 900° F. The reaction pressure is usually 15 to 50 p.s.i.a. Pressures of about 50 to 1100 p.s.i.a. or more can be used with advantage. Space rates of the order of about 0.1 to 5, preferably about 0.25 to 3, weight of charge per weight of catalyst per hour (WHSV), can be employed.

In a preferred embodiment, the methyl-substituted aromatic compound employed is toluene and the disporportionation products are benzene and xylenes. Other suitable methyl-substituted aromatic compounds include xylenes, ethyl-toluene, mesitylene, pseudocumene, durene, and polycyclic aromatics, preferably methyl benzenes of 1 to about 4 methyl groups.

The oxygen-supplying material employed with the methyl-substituted aromatic compound is preferably air. Examples of other suitable oxygen-supplying materials are oxygen, carbon dioxide, t-butanol, water, phenol, benzoic acid, benzyl alcohol, and benzaldehyde. A sufficient amount of oxygen-supplying material is employed with the methyl-substituted aromatic compound to produce increased disproportionation of the feed. About 0.1 to 6 wt. percent or more of oxygen-supplying material based on the methyl-substituted aromatic compound is often used. It can be desirable to use about 0.1 to 6 wt. percent or more oxygen, for instance, as about 0.5 to 30 wt. percent or more air. It is not desirable to use so much oxygen-supplying material as would effect significant oxidation of the methyl-substituted aromatic compound.

The metal-exchanged crystalline aluminosilicate containing catalysts which are employed in this invention, whether synthetic or naturally-occurring, have a pore size of about 8–15 A. and preferably the pores have a size of about 10–14 A. Usually, with a given material, the pores are relatively uniform in size and often the crystalline aluminosilicate particles have an ultimate crystal size of about 0.5 to 1.5 microns. In the crystalline aluminosilicate the silica to alumina mole ratio is greater than 3:1 and is usually not above about 8:1, preferably being about 4 to 6:1.

The crystalline aluminosilicate is generally available in the alkali metal faujasite form. For example, sodium crystalline aluminosilicate often has a sodium oxide to alumina ratio of about 0.7 to 1.1:1, e.g. about 1:1. The alkali metal acts as a catalyst poison and undue amounts should not be present in the catalyst when used in the disproportionation. Therefore, in the catalyst of the present invention, at least partial replacement of the alkali metal by either calcium, magnesium, or manganese is necessary to provide a catalyst of desirable characteristics.

The catalysts utilized in the present invention can be prepared by base-exchanging the alkali metal crystalline aluminosilicate by treating with a solution characterized by a pH in excess of about 3, preferably by a pH in the range of about 4.5 to 10, and containing either calcium, magnesium, or manganese ions which are capable of replacing the alkali metal, washing the resulting base-exchanged material free of water-soluble matter, drying the washed base-exchanged material and subjecting the same to a thermal activating treatment. The alkali metal content of the finished catalyst should be less than about 6, preferably less than about 3, wt. percent. The base-exchange solution may be contacted with the alkali metal crystalline aluminosilicate in the form of a fine powder, a compressed pellet, extruded pellet, spheroidal bead or other suitable particle shape. The alkali metal crystalline aluminosilicate may be calcined prior to base-exchange in an atmosphere which does not adversely affect the aluminosilicate such as air, nitrogen, hydrogen, flue gas, helium or other inert gas, at a temperature in the approximate range of about 500° F. to 1500° F. for a period of at least about 1 hour and usually between about 1 and 48 hours.

Base-exchange required for introducing the necessary replacing ions is carried out for an adequate period of time, a sufficient number of times, and under appropriate temperature conditions to replace at least about 50 wt. percent, often about 60 to 90 wt. percent, of the alkali metal originally contained in the aluminosilicate and to effectively reduce the alkali metal content of the resulting catalyst to below about 6 wt. percent. It is contemplated that various ionizable compounds of calcium, magnesium, or manganese capable of replacing the alkali metal may be employed for base-exchange either alone or as mixtures. Compounds will be used wherein the replacing ion is in the cationic state. Inorganic salts will usually be employed. Organic salts of the foregoing metals, such as acetate and formate may also be used.

While water will ordinarily be the solvent in the base-exchange solutions used, it is contemplated that other solvents, although generally less preferred, may be used. Thus, in addition to aqueous solutions, alcoholic solutions, etc. of suitable compounds as noted above, may be employed in producing the catalyst utilized in the present process. It will be understood that the compounds employed for the base-exchange solution undergo ionization in the particular solvent used.

The concentration of compound employed in the base-exchange solution may vary depending on the nature of the particular compound used, on the alkali metal crystalline aluminosilicate undergoing treatment and on the conditions under which treatment is effected. Generally, the concentration of compound, the cation of which replaces alkali metal from the alkali metal aluminosilicate, is within the range of 0.2 to 30 wt. percent, although as noted hereinabove other solution concentrations may be employed.

The temperature at which base-exchange is effected may vary widely, generally ranging from room temperature to an elevated temperature below the boiling point of the treating solution. While the volume of base-exchange solution employed may vary widely, generally an excess is employed and such excess is removed from contact with the crystalline aluminosilicate after a suitable period of contact. The time of contact between the base-exchange solution and crystalline aluminosilicate in any instance in successive contacts is such as to effect replacement of the alkali metal ions thereof to an extent such that the alkali metal content of the catalyst after undergoing base-exchange is satisfactorily reduced. It will be appreciated that such period of contact may vary widely depending on the temperature of the solution, the nature of the alkali metal aluminosilicates used, and the particular compound employed for base-exchange. Thus, the time of contact may extend from a brief period of the order of a few hours for small particles to longer periods of the order of days for large pellets.

After base-exchange treatment, the catalyst is removed from the treating solution. Anions introduced as a result of treating with the base-exchange solution are removed by water-washing the treated composite for such period of time until the same is free of said anions. The washed product is then dried, generally in air, to remove substantially all the water therefrom. While drying may be effected at ambient temperature, it is more satsifactory to facilitate the removal of moisture by maintaining the product at a temperature between about 150 and 600° F. for about 4 to 48 hours.

The dried material is then subjected to an activating treatment essential to render the composition catalytically active. Such treatment entails heating the dried material in an atmosphere, which does not adversely affect the catalyst such as air, nitrogen, hydrogen, flue gas, helium or other inert gas. The dried material can be heated in air to a temperature in the approximate range of about 50° F. to 1500° F. for a period of at least about 1 hour and usually between about 1 and 48 hours.

The active aluminosilicate component prepared in the foregoing manner can be combined, dispersed or otherwise intimately admixed with a porous matrix in such proportions that the resulting product contains from about 5 to 95 wt. percent, preferably about 15 to 80 wt. percent, of the aluminosilicate in the final composite. The incorporation of the aluminosilicate into the porous matrix can be accomplished either before, after, or during the base-exchange treatment. Particularly preferred matrices are inorganic oxide gels such as alumina and silica-alumina because of their superior porosity, attrition resistance and stability under reaction conditions.

The following examples will serve further to illustrate the present invention.

Example I

The calcium-exchanged crystalline aluminosilicate containing catalyst was prepared from an extrudate containing sodium crystalline aluminosilicate having pores of about 13 angstrom units and typically having a silica to alumina mole ratio of about 4.5 plus 20 wt. percent boehmite extrudate. The sodium crystalline aluminosilicate plus 20 wt. percent boehmite material used was a 1/16 inch extrudate which was calcined at 1050° F. for 3 hours prior to the calcium-exchange treatments. This calcined material contained 6.87 wt. percent Na and 1.57 wt. percent VM (1000° C.). The calcium-exchanged crystalline aluminosilicate containing catalyst was prepared from the sodium crystalline aluminosilicate plus 20 wt. percent boehmite extrudate by two exchanges at 150° F. with calcium nitrate in aqueous solution followed by washing, drying, and calcining for three hours at 900° F. The calcined catalyst contained 5.53 wt. percent Ca, 2.11 wt. percent Na, and 3.51 wt. percent VM (1000° C.).

The calcium-exchanged crystalline aluminosilicate containing catalyst (60 gm.) was charged to a 1 inch O.D., 20 inch long Pyrex reactor. Glass wool was used to seal the ends of the reactor. Electrician's beads were utilized to fill the tube to the top of the heating zone. The reactor was then placed in a three element furnace and heated to 800° F. under a nitrogen purge of 100 cc./min. The upper and lower segments of the furnace were regulated by Variac while the center section was Guardsman controlled. The nitrogen was monitored with a flowmeter. The system was allowed to equilibrate overnight. The nitrogen flow was then interrupted and the feeds introduced. The methyl-substituted aromatic compound was toluene and it was fed from a burette with a Lapp Pulsa-feeder pump. Where the oxygen-supplying materials were liquids at room temperature, they were blended directly into the toluene and the mixture was fed to the reactor. Where the oxygen-supplying materials were gases at room temperature, they were added through a calibrated flowmeter to the toluene stream entering the reactor. Temperatures were measured with I-C thermocouples. The reactor effluent comprising benzene and xylenes was collected in a room temperature trap and analyzed at various intervals by gas phase chromatography. Nitration grade toluene was used as the methyl-substituted aromatic compound feed. The reactor was operated at a 0.33 WHSV, a temperature of 800° F. and at atmospheric pressure. At the end of the run, the feed was stopped and a nitrogen purge for one hour at 100 cc./min. was maintained to remove any liquid from the catalyst. The heat was then turned off and the reactor allowed to come to room temperature under a nitrogen purge. The catalyst was discharged and weighed for coke content. Results of the various runs are contained in Tables I and II and described below.

TABLE I.—DISPROPORTIONATION OF TOLUENE

Conditions: 800° F., 0.33 WHSV, 1 atm.
Catalyst: Calcium-exchanged crystalline aluminosilicate plus 20% boehmite extrudate

| Oxygen-supplying material | Wt. percent oxygen-supplying material | Weight percent toluene conversion, time, min.[1] | | | |
|---|---|---|---|---|---|
| | | 60 | 180 | 390 | 450 |
| Air | 2 | 10.85(30) | 23.92(150) | 36.55 | |
| Air | 4 | 17.91 | 31.13 | | 43.67 |
| None | | 44.03 | 17.08 | 14.92(330) | |

[1] Time figures in parentheses are those other than the time heading the column.

Toluene was fed into the reactor with no oxygen-supplying material, with 2 wt. percent air supplied, and with 4 wt. percent air supplied under the stated disproportionation conditions. As shown in Table I, when no oxygen-supplying material was present, the conversion of toluene decreased with time when toluene was disproportionated over a calcium-exchanged crystalline aluminosilicate containing catalyst. This decrease is fairly typical of catalytic processes and is often due to coking deactivation. The supplying of 2 to 4 wt. percent air gave a complete reversal of this curve and toluene conversion increased with time.

TABLE II.—DISPROPORTIONATION OF TOLUENE

Conditions: 800° F., 0.33 WHSV, 1 atm.
Catalyst: Calcium-exchanged crystalline aluminosilicate plus 20% boehmite extrudate

| Oxygen-supplying material | Wt. percent oxygen-supplying material | Weight percent toluene conversion, time, min.[1] | | |
|---|---|---|---|---|
| | | 30 | 210 | 450 |
| None | | 6.93 | 5.97(220) | 7.26(452) |
| Air | 2 | 8.15 | 19.71 | 29.67(472) |
| CO | 0.70 | 7.59 | 8.73 | 8.50(390) |
| $CO_2$ | 0.55 | 8.87 | 12.83(195) | 13.39 |
| Phenol | 2.35 | 7.59 | 14.24 | 16.19 |
| Benzoic acid | 1.53 | 4.92 | 15.78 | 18.53 |
| Benzyl alcohol | 2.70 | 7.77 | 17.60(220) | 20.82 |
| $H_2O$ | 0.45 | 10.29 | 13.48 | 21.11 |
| t-Butanol | 1.85 | 8.32 | 14.32 | 21.94(480) |
| Benzaldehyde | 2.65 | 8.51 | 20.86 | 29.02 |

[1] Time figures in parenthesis are those other than the time heading column.

Toluene was fed into the reactor with no oxygen-supplying material present under the stated disproportionation conditions. As shown in Table II, the conversion of toluene remained essentially constant at about a 7 wt. percent conversion over a 7 hour period. Toluene was fed into the reactor with 2 wt. percent air supplied under the stated disproportionation conditions. As shown in Table II, the conversion of toluene increased from about 8 wt. percent to nearly 30 wt. percent in a period somewhat over 7 hours. The catalyst used in the runs contained in Table II differed from the catalyst used in the runs contained in Table I in that the former catalyst had been regenerated several times and the initial "flush" activity seemed to no longer be present.

Toluene was fed into the reactor with 0.70 wt. percent carbon monoxide supplied under the stated disproportionation conditions. As shown in Table II, the conversion of toluene increased only about 1 wt. percent over a 6 hour period. This is probably within the limits of experimental error of the run where no oxygen-supplying material was present and the conversion of toluene remained essentially constant at 7 wt. percent. Carbon monoxide may have more effect on increasing the conversion of toluene when greater amounts are supplied.

Example II

The magnesium-exchanged crystalline aluminosilicate containing catalyst was prepared from a sodium crystalline aluminosilicate plus 20 wt. percent boehmite extrudate similar to that of Example I. The sodium crystalline aluminosilicate plus 20 wt. percent boehmite material used was a 1/16 inch extrudate which was calcined at 1050° F. for 3 hours prior to the magnesium exchange treatments. This calcined material contained 6.87 wt. percent Na and 1.57 wt. percent VM (1000° C.). The magnesium-exchanged, crystalline aluminosilicate-containing catalyst was prepared from the sodium crystalline aluminosilicate plus 20 wt. percent boehmite extrudate by three exchanges with magnesium nitrate in aqueous solution at 80° C. followed by washing, drying, and calcining for three hours at 1050° F. The calcinated catalyst contained 4.25 wt. percent Mg and 2.96 wt. percent Na.

The magnesium-exchanged crystalline aluminosilicate containing catalyst (60 gm.) was charged to the reactor in the same manner as in Example I. Nitration grade toluene was used as the methyl-substituted aromatic compound feed and the oxygen-supplying material was air. The disproportionation was carried out in the same manner as in Example I. Results of the runs are contained in Table III and described below.

TABLE III.—DISPROPORTIONATION OF TOLUENE

Conditions: 800° F., 0.33 WHSV, 1 atm.
Catalysts: Magnesium-exchanged crystalline aluminosilicate plus 20% boehmite extrudate

| Oxygen-supplying material | Wt. percent oxygen-supplying material | Weight percent toluene conversion, time, min. | | |
|---|---|---|---|---|
| | | 30 | 210 | 450 |
| None | | 11.51 | 10.15 | 12.77 |
| Air | 2 | 18.26 | 50.63 | 41.22 |

Toluene was fed into the reactor with no oxygen supplying material and with 2 wt. percent air added under the stated disproportionation conditions. As shown in Table III, the conversion of toluene increased only about 1 wt. percent over a 7 hour period when no air was supplied while the conversion of toluene increased from 18 wt. percent to 41 wt. percent over a 7 hour period when 2 wt. percent air was supplied.

Example III

The manganese-exchanged crystalline aluminosilicate containing catalyst was prepared from a sodium crystalline aluminosilicate plus 20 wt. percent boehmite extrudate similar to that of Example I. The sodium crystalline aluminosilicate plus 20 wt. percent boehmite material used was a 1/16 inch extrudate which was calcined at 1050° F. for 3 hours prior to the manganese exchange treatments. This calcined material contained 6.87 wt. percent Na and 1.57 wt. percent VM (1000° C.). The manganese-exchanged, crystalline aluminosilicate-containing catalyst was prepared from the sodium crystalline aluminosilicate plus 20 wt. percent boehmite extrudate by three exchanges with manganese acetate in aqueous solution at 80° C. followed by washing, drying, and calcining for three hours at 1050° F. The calcined catalyst contained 6.95 wt. percent Mn and 2.93 wt. percent Na.

The manganese-exchanged, crystalline aluminosilicate containing catalyst (60 gm.) was charged to the reactor in the same manner as in Example I. Nitration grade toluene was used as the methyl-substituted aromatic compound feed and the oxygen-supplying material was air. The disproportionation was carried out in the same manner as in Example I. Results of the runs are contained in Table IV and described below.

TABLE IV.—DISPROPORTIONATION OF TOLUENE

Conditions: 800° F., 0.33 WHSV, 1 atm.
Catalyst: Manganese-exchanged crystalline aluminosilicate plus 20% boehmite extrudate

| Oxygen-Supplying material | Wt. percent Oxygen-Supplying material | Weight percent toluene conversion, time, min.[1] | | |
|---|---|---|---|---|
| | | 30 | 210 | 450 |
| None | | 14.25 | 6.24 | 7.64(330) |
| Air | 2 | 7.83 | 24.52 | 41.04 |

[1] Time figures in parentheses are those other than the time heading the column.

Toluene was fed into the reactor with no oxygen supplying material and with 2 wt. percent air added under the stated disproportionation conditions. As shown in Table IV, the conversion of toluene is relatively constant (with the exception of the 30 minute point) at 7 wt. percent conversion over a 7 hour period when no air was supplied while the conversion of toluene increased from nearly 8 wt. percent to 41 wt. percent over a 7 hour period when 2 wt. percent air was supplied.

It is claimed:

1. A disproportionation process which comprises contacting a methyl-substituted aromatic hydrocarbon and a small amount of an oxygen-supplying material sufficient to increase disproportionation, with a metal-exchanged, crystalline aluminosilicate catalyst, wherein said metal is selected from the group consisting of calcium, magnesium, and manganese and said crystalline aluminosilicate has a pore size of about 8–15 Angstrom units, and a silica to alumina mole ratio greater than 3:1 up to about 8:1, and containing less than about 6 percent sodium, said contacting being at a temperature of about 200 to 1100° F. under disproportionation conditions to disproportionate said feed.

2. The process of claim 1 wherein the oxygen-supplying material is oxygen.

3. The process of claim 2 wherein the oxygen is present in the amount of about 0.1 to 6 wt. percent based on the methyl-substituted aromatic hydrocarbon.

4. The process of claim 2 wherein the oxygen is supplied as air.

5. The process of claim 3 wherein the oxygen is supplied as air.

6. The process of claim 1 wherein the oxygen-supplying material is selected from the group consisting of carbon dioxide, water, t-butanol, phenol, benzaldehyde, benzoic acid, and benzyl alcohol.

7. The process of claim 6 wherein the oxygen-supplying material is present in the amount of about 0.1 to 6 wt. percent based on the methyl-substituted aromatic hydrocarbon.

8. The process of claim 1 wherein the methyl-substituted aromatic is a methyl benzene of 1 to 4 methyl groups.

9. The process of claim 8 wherein the methyl-substituted aromatic hydrocarbon is toluene and the disproportionation of said feed produces benzene and xylene.

10. The process of claim 9 wherein the temperature is about 600 to 900° F.

11. The process of claim 1 wherein the metal-exchanged crystalline aluminosilicate containing catalyst has a pore size of about 10–14 angstrom units, and a silica to alumina mole ratio from about 4:1 to 6:1.

12. A disproportionation process which comprises contacting under disproportionation conditions including a temperature of about 600 to 900° F. a methyl-substituted benzene having 1 to 4 methyl groups and a small amount of an oxygen-supplying material sufficient to increase disproportionation, with an at least about 50 percent metal-exchanged crystalline aluminosilicate catalyst wherein said metal is selected from the group consisting of calcium, magnesium, and manganese and said crystalline aluminosilicate has a pore size of about 10 to 14 angstrom units, and a silica to alumina mole ratio of about 4:1 to 6:1.

13. The process of claim 12 wherein the oxygen-supplying material is air.

14. The process of claim 13 wherein the amount of air is about 0.5 to 30 weight percent based on the methyl-substituted aromatic.

15. The process of claim 14 wherein the methyl-substituted aromatic is toluene.

16. The process of claim 15 wherein the metal is calcium.

17. The process of claim 15 wherein the metal is magnesium.

18. The process of claim 15 wherein the metal is manganese.

References Cited

UNITED STATES PATENTS

| | | | |
|---|---|---|---|
| 3,140,253 | 7/1964 | Plank et al. | 208—120 |
| 3,175,967 | 3/1965 | Miale et al. | 208—120 |

DELBERT E. GANTZ, *Primary Examiner.*

C. R. DAVIS, *Assistant Examiner.*